US010275872B2

(12) United States Patent
Pomeranz et al.

(10) Patent No.: US 10,275,872 B2
(45) Date of Patent: Apr. 30, 2019

(54) METHOD OF DETECTING REPEATING DEFECTS AND SYSTEM THEREOF

(71) Applicant: Applied Materials Israel Ltd., Rehovot OT (IL)

(72) Inventors: Karen Pomeranz, Hod Hasharon (IL); Eyal Neistein, Herzliya (IL); Vivek Balasubramanian, Portland, OR (US); Moshe Amzaleg, Beer Sheva (IL); Eyal Bassa, Matan (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 41 days.

(21) Appl. No.: 15/685,995

(22) Filed: Aug. 24, 2017

(65) Prior Publication Data
US 2019/0066292 A1 Feb. 28, 2019

(51) Int. Cl.
*G06K 9/00* (2006.01)
*G06T 7/00* (2017.01)

(52) U.S. Cl.
CPC .. *G06T 7/0008* (2013.01); *G06T 2207/10061* (2013.01); *G06T 2207/30148* (2013.01)

(58) Field of Classification Search
CPC ..... G06T 7/001; G06T 7/0008; G06T 7/0002; G06T 7/0006; G06T 7/408; G06T 2207/30148; G06T 2207/10061; G01N 21/95607; H01L 21/67288; H01L 22/12
See application file for complete search history.

(56) References Cited

U.S. PATENT DOCUMENTS

| 7,071,468 B2 * | 7/2006 | Miyai | G01N 23/2251 250/306 |
| 7,266,235 B2 * | 9/2007 | Hiroi | G01N 21/9501 348/126 |
| 7,379,175 B1 * | 5/2008 | Stokowski | G01N 21/95607 356/237.5 |

(Continued)

OTHER PUBLICATIONS

Cho, K. Y., et al., "The analysis of EUV mask defects using a wafer defect inspection system." In Extreme Ultraviolet (EUV) Lithography (vol. 7636, p. 76361E). International Society for Optics and Photonics. (Mar. 2010).

(Continued)

*Primary Examiner* — Amir Alavi
(74) *Attorney, Agent, or Firm* — Lowenstein Sandler LLP

(57) ABSTRACT

There are provided system and method of detecting repeating defects on a specimen, the specimen obtained by printing two or more mask fields thereon, each of mask field comprising multiple dies, the method comprising: scanning the specimen to capture a plurality of first images from first dies located at the same position in the mask fields, and, for each first image, capture two or more second images from dies located in different positions from the first dies; generating a plurality of third images corresponding to the plurality of first images; generating, an average third image constituted by pixels with values computed as accumulated pixel values of corresponding pixels in the plurality of third images divided by the number of the two or more mask fields; and determining presence of repeating defects on the specimen based on the average third image and a predefined defect threshold.

20 Claims, 8 Drawing Sheets

(56) References Cited

U.S. PATENT DOCUMENTS

| | | | |
|---|---|---|---|
| 8,937,283 B2* | 1/2015 | Hatakeyama | H01J 37/244 250/310 |
| 9,727,047 B2* | 8/2017 | Luo | G05B 19/401 |
| 9,966,227 B2* | 5/2018 | Hatakeyama | H01J 37/244 |
| 2008/0106740 A1* | 5/2008 | Yu | G01N 21/95607 356/434 |
| 2009/0226076 A1* | 9/2009 | Sakai | G06T 7/001 382/149 |
| 2014/0270475 A1 | 9/2014 | Huang | |
| 2014/0341462 A1 | 11/2014 | Sezginer et al. | |
| 2015/0005917 A1 | 1/2015 | Yiin et al. | |
| 2015/0012900 A1 | 1/2015 | Shifrin et al. | |
| 2015/0078650 A1 | 3/2015 | Sezginer et al. | |
| 2015/0103351 A1 | 4/2015 | Hess et al. | |
| 2016/0061745 A1 | 3/2016 | Chen et al. | |
| 2016/0061749 A1 | 3/2016 | Chen et al. | |
| 2016/0150191 A1* | 5/2016 | Karsenti | H04N 7/181 382/149 |
| 2017/0200260 A1* | 7/2017 | Bhaskar | G06K 9/66 |

OTHER PUBLICATIONS

Halle, S. D., et al., "Toward defect guard-banding of EUV exposures by full chip optical wafer inspection of EUV mask defect adders." In Extreme Ultraviolet (EUV) Lithography VI (vol. 9422, p. 94221D). International Society for Optics and Photonics. (Apr. 2015).

Meli, L., et al., "Detection of printable EUV mask absorber defects and defect adders by full chip optical inspection of EUV patterned wafers." IEEE Transactions on Semiconductor Manufacturing, 30(4), 402-409. (2017).

Kimmel, K. R., et al., "Optimal Mask Characterization by Surrogate Wafer Print (SWaP) Method." In Photomask Technology 2008 (vol. 7122, p. 712219). International Society for Optics and Photonics (Oct. 2008).

Sivakumar, S. EUV: From development to HVM. In 2013 International workshop on EUV Lithography (2013).

* cited by examiner

METHOD OF DETECTING REPEATING DEFECTS AND SYSTEM THEREOF

TECHNICAL FIELD

The presently disclosed subject matter relates, in general, to the field of defect detection, and more specifically, to methods and systems of detecting repeating defects on a specimen.

BACKGROUND

Current demands for high density and performance associated with ultra large scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including frequent and detailed inspections of the devices while they are still in the form of semiconductor wafers.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "inspection" used in this specification should be expansively construed to cover any kind of detection and/or classification of defects in a specimen provided by using non-destructive inspection tools or inspection machines. By way of non-limiting example, the inspection process can include generating an inspection recipe and/or runtime scanning (in a single or in multiple scans), reviewing, measuring and/or other operations provided with regard to the specimen or parts thereof using the same or different inspection tools. Note that, unless specifically stated otherwise, the term "inspection" or its derivatives used in this specification are not limited with respect to resolution or size of inspection area.

A variety of non-destructive inspection tools includes, by way of non-limiting example, scanning electron microscopes (SEM), tunneling electron microscope (TEM), atomic force microscopes (AFM), optical inspection tools, etc.

Repeating defects, repeater defects, and repeater are used interchangeably in this specification to refer to defects that are repetitively distributed at multiple locations on the specimen. Repeating defects are normally caused by a defect on a lithography mask or reticle, e.g., foreign particles or objects on the mask. After a wafer is printed with this kind of mask, the defects appear repetitively on certain dies of the wafer due to the repetitive usage of the mask during printing. For example, defects repeat at the same or substantially the same location in multiple dies (or every die) on the wafer.

A die-to-die (D2D) inspection is sometimes used for detecting repeating defects. In the die-to-die method, the presence or absence of a defect in a location is checked by comparing the pattern at the desired location in an inspected die with the pattern of the same location in another die, for example, a previously inspected die on the same wafer. A disadvantage of using a reference die for inspection is that, since the two locations in the inspected die and reference die are subjected to different variations, for example, process variations, mechanical and electrical variations, etc., such variations impose noise, which in some cases can be relatively high and can interfere with defect detection or decrease the sensitivity of defect detection. Such noise should be considered and disregarded, otherwise detection sensitivity and integrity are hindered. For instance, in a relatively noisy environment, the real repeating defects can be buried within noise and cannot be duly detected. This challenge increases as the design rules shrinks.

There is a need in the art for improving the sensitivity of detecting repeating defects.

GENERAL DESCRIPTION

In accordance with certain aspects of the presently disclosed subject matter, there is provided computerized system of detecting repeating defects on a specimen, the specimen being obtained by printing two or more mask fields thereon, each of the two or more mask fields comprising multiple dies, the system comprising: an inspection unit configured to capture a plurality of first images from first dies all located at the same position in the two or more mask fields printed on the specimen, and, for each of the plurality of the first images, capture two or more second images each from a second die located in a different position from positions of the first dies in the two or more mask fields; and a processing unit operatively connected to the inspection unit, the processing unit comprising a memory and a processor operatively coupled thereto, wherein the processing unit is configured to: generate a third image for each first image, thereby obtaining a plurality of third images corresponding to the plurality of first images, wherein generating a third image for a given first image comprises: generating a difference image based on a difference between pixel values of the given first image and pixel values derived from the two or more second images, and generating a corresponding third image constituted by pixels with values computed based on corresponding pixel values in the difference image and a predefined difference normalization factor; generate an average third image constituted by pixels with values computed as accumulated pixel values of corresponding pixels in the plurality of third images divided by the number of the two or more mask fields; and determine presence of repeating defects on the specimen based on the average third image and a predefined defect threshold.

In addition to the above features, the system according to this aspect of the presently disclosed subject matter can comprise one or more of features (i) to (xi) listed below, in any desired combination or permutation which is technically possible:

(i). The inspection unit can be an optical inspection machine or an E-beam inspection machine.

(ii). The two or more mask fields can be printed on the specimen using a lithography mask, the lithography mask being an Extreme Ultraviolet (EUV) mask or a Argon Fluoride (ArF) mask.

(iii). The two or more second images can be captured from two or more second dies adjacent to the first dies.

(iv). The processing unit can be further configured to segment the first images and the second images according to noise levels, and the generating a third image, generating an average third image, and the determining can be performed per segment.

(v). The first images and the second images can be captured respectively for one or more detection channels, and the generating a third image and generating an average third image can be performed respectively for each detection channel, giving rise to respective average third images.

The processor can be configured to determine presence of repeating defects on the specimen based on the respective average third images and a predefined composite defect threshold composed of a combination of one or more defect thresholds of the one or more detection channels.

(vi). The processing unit can be further configured to refine the values of pixels in each of the plurality of third images according to a Look-Up-Table (LUT).

(vii). The LUT can be defined based on prior knowledge of defect and noise distribution in the third images.

(viii). The processing unit can be further configured to apply a predefined filter for each of the plurality of third images.

(ix). The processing unit can be configured to, for each given third image: for each given pixel of at least part of the given third image, apply a predefined filter on a kernel with a predefined size centered around the given pixel, and assign a value to the given pixel according to a filtering result on the kernel.

(x). The processor can be further configured to perform field alignment for the plurality of third images corresponding to the first dies in the two or more mask fields to obtain a common area among the plurality of third images, and the generating an average third image can be performed for pixel values in the common area.

(xi). The generating a third image can comprises: generating a difference image based on a corrected difference between pixel values of the given first image and pixel values derived from the two or more second images, giving rise to a corrected difference image so as to compensate noises occurred in the given first image; and generating a corresponding third image constituted by pixels with values computed based on corresponding pixel values in the corrected difference image and a predefined difference normalization factor.

In accordance with another aspect of the presently disclosed subject matter, there is provided a computerized method of detecting repeating defects on a specimen, the specimen being obtained by printing two or more mask fields thereon, each of the two or more mask fields comprising multiple dies, the method comprising: capturing, by an inspection unit, a plurality of first images from first dies all located at the same position in the two or more mask fields printed on the specimen, and, for each of the plurality of the first images, capturing two or more second images each from a second die located in a different position from positions of the first dies in the two or more mask fields; generating, by a processing unit, a third image for each first image, thereby obtaining a plurality of third images corresponding to the plurality of first images, wherein generating a third image for a given first image comprises: generating a difference image based on a difference between pixel values of the given first image and pixel values derived from the two or more second images, and generating a corresponding third image constituted by pixels with values computed based on corresponding pixel values in the difference image and a predefined difference normalization factor; generating, by the processing unit, an average third image constituted by pixels with values computed as accumulated pixel values of corresponding pixels in the plurality of third images divided by the number of the two or more mask fields; and determining, by the processing unit, presence of repeating defects on the specimen based on the average third image and a predefined defect threshold.

This aspect of the disclosed subject matter can comprise one or more of features (i) to (xi) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of detecting repeating defects on a specimen, the specimen being obtained by printing two or more mask fields thereon, each of the two or more mask fields comprising multiple dies, the method comprising: obtaining a plurality of first images from first dies all located at the same position in the two or more mask fields printed on the specimen, and, for each of the plurality of the first images, obtaining two or more second images each from a second die located in a different position from positions of the first dies in the two or more mask fields; generating a third image for each first image, thereby obtaining a plurality of third images corresponding to the plurality of first images, wherein generating a third image for a given first image comprises: generating a difference image based on a difference between pixel values of the given first image and pixel values derived from the two or more second images, and generating a corresponding third image constituted by pixels with values computed based on corresponding pixel values in the difference image and a predefined difference normalization factor; generating an average third image constituted by pixels with values computed as accumulated pixel values of corresponding pixels in the plurality of third images divided by the number of the two or more mask fields; and determining presence of repeating defects on the specimen based on the average third image and a predefined defect threshold.

This aspect of the disclosed subject matter can comprise one or more of features (i) to (xi) listed above with respect to the system, mutatis mutandis, in any desired combination or permutation which is technically possible.

In accordance with further aspect of the presently disclosed subject matter, there is provided a computerized system of detecting repeating defects on a first specimen, the first specimen being obtained by printing two or more mask fields thereon at a present time, each of the two or more mask fields comprising a single die, the system comprising: an inspection unit configured to capture a plurality of first images from dies in the two or more mask fields printed on the first specimen; and a processing unit operatively connected to the inspection unit, the processing unit comprising a memory and a processor operatively coupled thereto, wherein the processing unit is configured to: obtain two or more previous images captured from dies in the two or more mask fields printed on a second specimen, the second specimen being obtained by printing the two or more mask fields thereon at a baseline time; generate a second image based on the two or more previous images; generate a third image for each first image, thereby obtaining a plurality of third images corresponding to the plurality of first images, wherein generating a third image for a given first image comprises: generating a difference image based on a difference between pixel values of the given first image and pixel values of the second image, and generating a corresponding third image constituted by pixels with values computed based on corresponding pixel values in the difference image and a predefined difference normalization factor; generate an average third image constituted by pixels with values computed as accumulated pixel values of corresponding pixels in the plurality of third images divided by the number of the two or more mask fields; and determine presence of repeating defects on the specimen based on the average third image and a predefined defect threshold.

In addition to the above features, the system according to this aspect of the presently disclosed subject matter can comprise one or more of features (i) to (xi) listed below, in any desired combination or permutation which is technically possible:

(i). The inspection unit can be an optical inspection machine or an E-beam inspection machine.

(ii). The two or more mask fields can be printed on the specimen using a lithography mask, the lithography mask being an Extreme Ultraviolet (EUV) mask or a Argon Fluoride (ArF) mask.

(iii). The second image can be generated by averaging the two or more previous images.

(iv). The processing unit can be further configured to segment the first images and the second image according to noise levels, and the generating a third image, generating an average third image, and the determining can be performed per segment.

(v). The first images and the previous images can be captured respectively for one or more detection channels, and the generating a second image, generating a third image and generating an average third image can be performed respectively for each detection channel, giving rise to respective average third images. The processor can be configured to determine presence of repeating defects on the specimen based on the respective average third images and a predefined composite defect threshold composed of a combination of one or more defect thresholds of the one or more detection channels.

(vi). The processing unit can be further configured to refine the values of pixels in each of the plurality of third images according to a Look-Up-Table (LUT).

(vii). The LUT can be defined based on prior knowledge of defect and noise distribution in the third images.

(viii). The processing unit can be further configured to apply a predefined filter for each of the plurality of third images.

(ix). The processing unit can be configured to, for each given third image: for each given pixel of at least part of the given third image, apply a predefined filter on a kernel with a predefined size centered around the given pixel, and assign a value to the given pixel according to a filtering result on the kernel.

(x). The processor can be further configured to perform field alignment for the plurality of third images corresponding to the dies in the two or more mask fields to obtain a common area among the plurality of third images, and the generating an average third image can be performed for pixel values in the common area.

(xi). The generating a third image can comprises: generating a difference image based on a corrected difference between pixel values of the given first image and pixel values derived from the two or more second images, giving rise to a corrected difference image so as to compensate noises occurred in the given first image; and generating a corresponding third image constituted by pixels with values computed based on corresponding pixel values in the corrected difference image and a predefined difference normalization factor.

In accordance with another aspect of the presently disclosed subject matter, there is provided a computerized method of detecting repeating defects on a first specimen, the first specimen being obtained by printing two or more mask fields thereon at a present time, each of the two or more mask fields comprising a single die, the method comprising: capturing a plurality of first images from dies in the two or more mask fields printed on the first specimen; obtaining two or more previous images captured from dies in the two or more mask fields printed on a second specimen, the second specimen being obtained by printing the two or more mask fields thereon at a baseline time; generating a second image based on the two or more previous images; generating a third image for each first image, thereby obtaining a plurality of third images corresponding to the plurality of first images, wherein generating a third image for a given first image comprises: generating a difference image based on a difference between pixel values of the given first image and pixel values of the second image, and generating a corresponding third image constituted by pixels with values computed based on corresponding pixel values in the difference image and a predefined difference normalization factor; generating an average third image constituted by pixels with values computed as accumulated pixel values of corresponding pixels in the plurality of third images divided by the number of the two or more mask fields; and determining presence of repeating defects on the specimen based on the average third image and a predefined defect threshold.

This aspect of the disclosed subject matter can comprise one or more of features (i) to (xi) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of detecting repeating defects on a first specimen, the first specimen being obtained by printing two or more mask fields thereon at a present time, each of the two or more mask fields comprising a single die, the method comprising: obtaining a plurality of first images from dies in the two or more mask fields printed on the first specimen; obtaining two or more previous images captured from dies in the two or more mask fields printed on a second specimen, the second specimen being obtained by printing the two or more mask fields thereon at a baseline time; generating a second image based on the two or more previous images; generating a third image for each first image, thereby obtaining a plurality of third images corresponding to the plurality of first images, wherein generating a third image for a given first image comprises: generating a difference image based on a difference between pixel values of the given first image and pixel values of the second image, and generating a corresponding third image constituted by pixels with values computed based on corresponding pixel values in the difference image and a predefined difference normalization factor; generating an average third image constituted by pixels with values computed as accumulated pixel values of corresponding pixels in the plurality of third images divided by the number of the two or more mask fields; and determining presence of repeating defects on the specimen based on the average third image and a predefined defect threshold.

This aspect of the disclosed subject matter can comprise one or more of features (i) to (xi) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "scanning", "capturing", "generating", "determining", "segmenting", "performing", "refining", "applying", "filtering", "selecting", "assigning", "correcting", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the repeating defect detection system and parts thereof as well as the processing unit and/or processing circuitry therein disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature or void formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
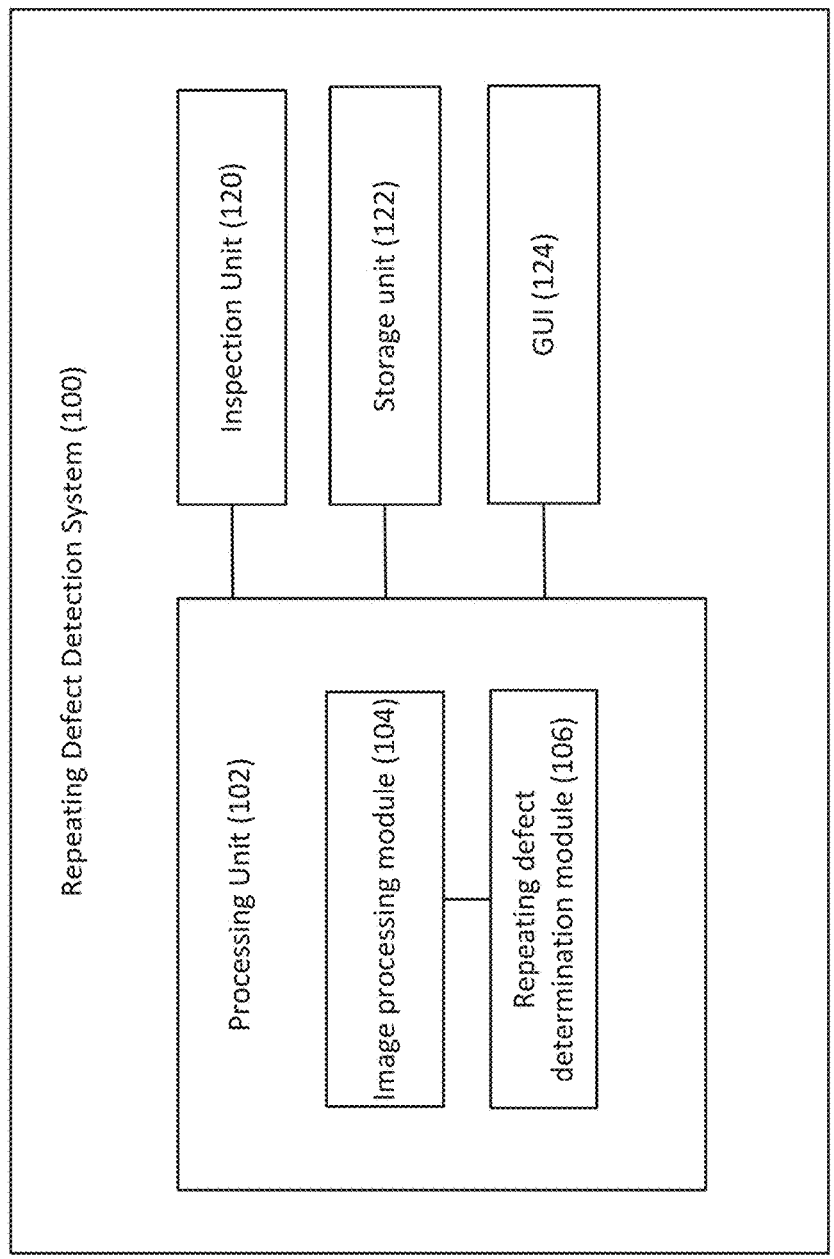
FIG. 1 illustrates a block diagram of a repeating defect detection system in accordance with certain embodiments of the presently disclosed subject matter.

Bearing this in mind, attention is drawn to FIG. 1 illustrating a block diagram of a repeating defect detection system in accordance with certain embodiments of the presently disclosed subject matter.

The repeating defect detection system 100 illustrated in FIG. 1 can be used for detecting repeating defects on a specimen (e.g. on a wafer and/or parts thereof). The specimen is obtained using a lithography mask (also termed herein as a photomask or a mask) or reticle. By printing or imaging with the mask, the patterns on the mask are transformed to the specimen. A mask field refers to the area or region of the mask that is printed on the specimen. In some cases, a mask field can comprise multiple dies. The multiple dies can have the same patterns. In some other cases a mask field can comprise a single die.

In accordance with certain embodiments of the present disclosure, two or more mask fields are printed or imaged on the specimen, each of the mask fields comprising multiple dies. Since the patterns printed on the specimen are reproductions of those on the mask, if there is any defect on the mask, such defect will be reproduced repetitively on the specimen due to the repetitive imaging or printing of the mask. For example, consider a mask field that contains four dies. A single defect on one of the four dies on the mask is capable of causing product failure which reduces yield by 25%. Therefore, detecting repeating defects which are repetitively distributed at multiple locations on the specimen can be critical and important as it can provide indications of defectivity of a corresponding mask. Continuing with the aforementioned example, defects repeat at the same or substantially the same location in every four dies on the wafer can be detected and indicates a corresponding defect on the mask.

Repeating defect detection system 100 can comprise, or be operatively connected to, an inspection unit 120. The term "inspection unit" used herein should be expansively construed to cover any inspection tools or inspection machines that can be used in inspection-related processes including, by way of non-limiting example, imaging, scanning (in a single or in multiple scans), sampling, reviewing, measuring, classifying and/or other processes provided with regard to the specimen or parts thereof. The present disclosure is not limited by the inspection technology. By way of example, the inspection unit can be an optical inspection tool or E-beam inspection tool. Non-limiting examples of inspection tools include scanning electron microscope (SEM), Tunneling Electron Microscope (TEM), optical metrology (OCD) or Atomic Force Microscopy (AFM)).

The inspection unit 120 can be configured to scan the specimen to capture images thereof. As aforementioned, the specimen as described in accordance with certain embodiments of the present disclosure has two or more mask fields printed thereon, each of the mask fields comprising multiple dies. The inspection unit 120 can be configured to scan at least part of the specimen to capture a plurality of first images (hereinafter also referred to as inspection images) from first dies all located at the same position in the two or more mask fields printed on the specimen. The inspection unit 120 can also be configured to, for each of the plurality of the first images, capture two or more second images (hereinafter also referred to as reference images) each from a second die located in a different position from positions of the first dies in the two or more mask fields. According to certain embodiments, Repeating defect detection system 100 can comprise, or be operatively connected to a storage unit 122 which is configured to store images produced by the inspection unit 120 and/or derivatives thereof. Accordingly, the first images and second images can be retrieved from the storage unit 122 and provided to Repeating defect detection system 100 for further processing.

Repeating defect detection system 100 comprises a processing unit 102 operatively connected to the inspection unit 120. The processing unit 102 is a processing circuitry that is configured to provide all processing necessary for operating system 100 which is further detailed with reference to FIGS. 2-3. Processing unit 102 comprises a processor (not shown separately) and a memory (not shown separately). The processor of processing unit 102 can be configured to execute several functional modules in accordance with computer-readable instructions implemented on a non-transitory computer-readable memory comprised in the processing unit. Such functional modules are referred to hereinafter as comprised in the processing unit 102.

Functional modules comprised in the processor can include an image processing module 104 and a repeating defect determination module 106, which are operatively connected with each other. The image processing module 104 can be configured to generate a third image (hereinafter also referred to as grade image) for each first image, thereby obtaining a plurality of third images corresponding to the plurality of first images. Specifically, for generating a third image for a given first image, the image processing module 104 can be configured to generate a difference image based on a difference between pixel values of the given first image and pixel values derived from the two or more second images, and generate a corresponding third image constituted by pixels with values computed based on corresponding pixel values in the difference image and a predefined difference normalization factor.

Upon the plurality of third images being generated, the image processing module 104 can be further configured to generate an average third image constituted by pixels with values computed as accumulated pixel values of corresponding pixels in the plurality of third images divided by the number of the two or more mask fields. The repeating defect determination module 106 can be configured to determine presence of repeating defects on the specimen based on the average third image and a predefined defect threshold. Operations of the system 100, processing unit 102 and the functional modules therein will be further detailed with reference to FIGS. 2-3.

In some embodiments, the Repeating defect detection system 100 can optionally comprise a computer-based Graphical user interface (GUI) 124 which is configured to enable user-specified inputs related to system 100. For instance, the user can be presented with a visual representation of the specimen (for example, by a display forming part of GUI 124). The user may be provided, through the GUI, with options of defining certain operation parameters. The user may also view the detection results on the GUI.

According to certain embodiments, Repeating defect detection system 100 can be implemented as stand-alone computer(s) and can be operatively connected to the inspection unit 120 to operate in conjunction therewith. In such cases system 100 can receive, through an I/O interface, either directly or via one or more intermediate systems, the inspection images and reference images from the inspection unit and perform the image processing and repeating defect detection based on the received images. In some embodiments, the Repeating defect detection system 100 may be hosted by an inspection tool (e.g., the inspection unit 120) and may be configured to operate in conjunction with the hosting inspection tool and optionally with additional inspection tools. In some embodiments, system 100 may be integrated with an inspection tool (e.g., the inspection unit 120)—in such embodiments, components of the system 100 may form part of the inspection unit 120. For example, processing unit 102 and storage unit 122 may form part of the processing unit and storage, respectively, of the inspection unit 120; and the GUI (not shown in FIG. 1) of the inspection tool 120 may function as GUI 124.

Repeating defect detection system 100 can be further configured to provide, via an I/O interface, the detection results (or part thereof) to a storage system which may be the same as the storage unit 122, or may be in addition or in lieu of the storage unit 122. The results can also be sent to any of the inspection tool(s) and/or review tool(s) and/or any other external system, and/or to the GUI 124 for rendering the results.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that although the inspection unit 120, storage unit 122, and GUI 124 are illustrated as being part of the system 100 in FIG. 1, in some other embodiments, at least part of the aforementioned units can be implemented as being external to system 100 and can be configured to operate in data communication with system 100 via I/O interface. As aforementioned, in some cases, system 100 can be implemented as stand-alone computer(s) to be used in conjunction with the inspection unit 120. Alternatively, the respective functions of system 100 can, at least partly, be integrated with one or more inspection units 120.

Figure 2:
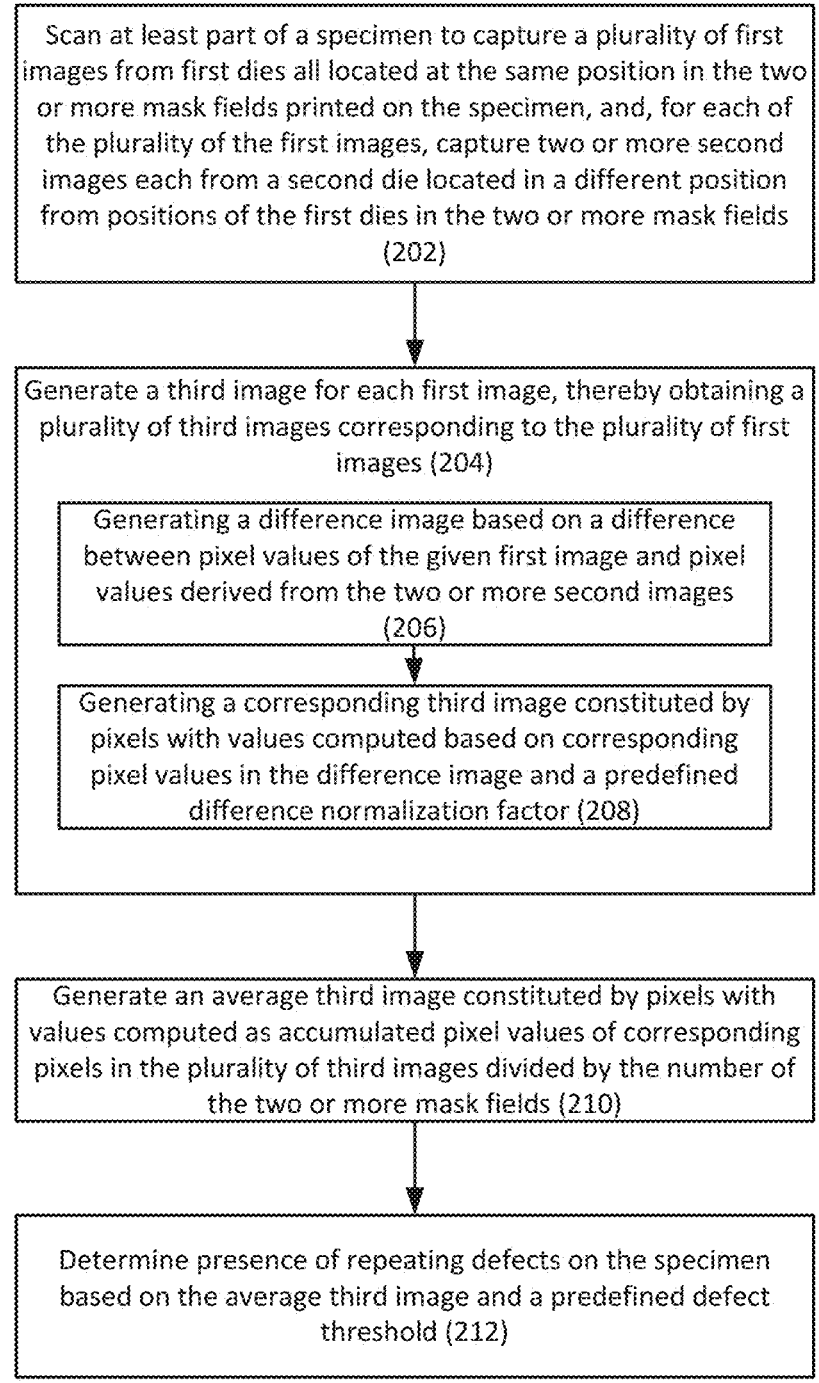
FIG. 2 illustrates a generalized flowchart of detecting repeating defects on a specimen in accordance with certain embodiments of the presently disclosed subject matter.

Referring to FIG. 2, there is illustrated a generalized flowchart of detecting repeating defects on a specimen in accordance with certain embodiments of the presently disclosed subject matter.

As described above, repeating defects (also termed herein as repeater or repeater defects) refer to defects that are repetitively distributed at multiple locations on the specimen, e.g., defects that repeat at the same or substantially the same location in multiple dies (or every single die) on the wafer. In some cases, repeating defects can be caused by a defect on a mask. Therefore, by detecting repeating defects on a specimen obtained using a mask and thus having the mask fields printed thereon, indications of a corresponding defect on the mask can be provided.

For purpose of illustration only, certain embodiments of the following description are provided with respect to wafers. Embodiments are, likewise, applicable to other types, sizes and representations of specimen.

According to certain embodiments, in the case where two or more mask fields are printed on the specimen and each mask field comprises multiple dies (also referred to herein as multiple die or multi-die scenario), at least part of the specimen can be scanned (202) (e.g., by the inspection unit 120 illustrated in FIG. 1) to capture a plurality of first images (i.e., inspection images) from first dies all located at the same position or location in the two or more mask fields printed on the specimen, and, for each of the plurality of the first images, capture two or more second images (i.e., reference images) each from a second die (i.e., reference die) located in a different position from positions of the first dies in the two or more mask fields.

Figure 7:
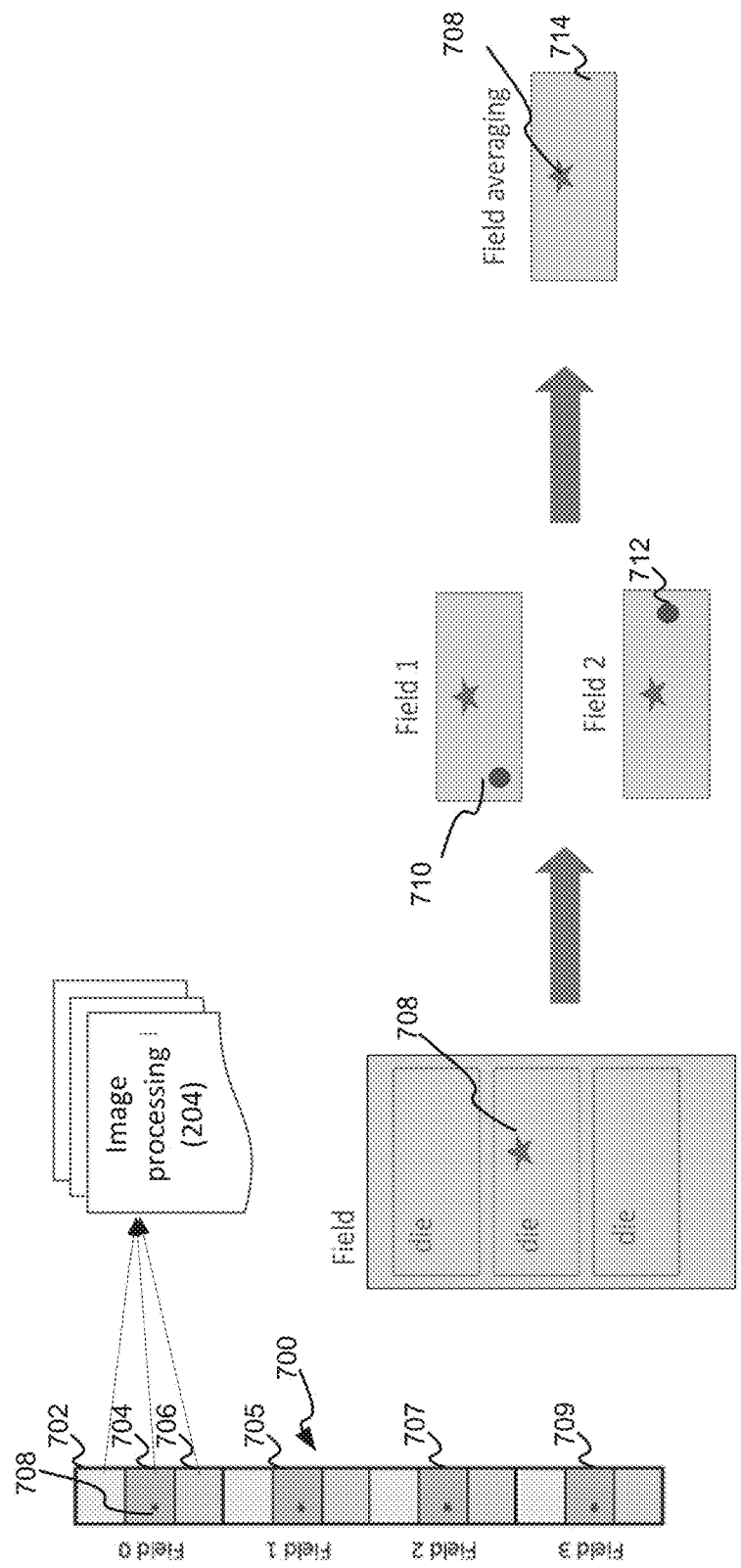
FIG. 7 illustrates an example of multiple mask fields printed on a specimen, each comprising multiple dies, in accordance with certain embodiments of the presently disclosed subject matter.

Turning now to FIG. 7, there is illustrated an example of multiple mask fields printed on a specimen, each comprising multiple dies, in accordance with certain embodiments of the presently disclosed subject matter.

For illustrative and exemplary purposes, there are shown four mask fields (i.e., field 0-field 3) printed in a column of a wafer 700, each of the mask field comprising three dies. However, it is to be noted a printed wafer as described herein is not limited to the number of fields printed thereon and the number of multiple dies comprised in each field. Taking field 0 as an example, field 0 comprises three dies 702, 704 and 706. On die 704, there is illustrated a defect 708, which appears repetitively at the same location in corresponding dies 705, 707 and 709 in all the other mask fields. Accordingly, the defect 708 and all its repetitions are repeating defects. In an amplified view of the mask fields, it can be seen that except for the repeating defects 708, there are also other random defects (or certain types of noises) present in the fields, such as, e.g., 710 as present in field 1 and 712 as present in field 2, which appear as a single instance and do not repeat themselves at the same location in all fields. These random defects are thus non-repeating defects and should be eliminated from the repeater detection results. Besides, noises caused by different variations in a die-to-die inspection, such as, process variations, mechanical and electrical variations, etc., should be dealt with, so as not to interfere with repeating defect detection or decrease the sensitivity of the detection.

By way of example, wafer 700 (or at least part thereof) is scanned by an inspection machine. Inspection images for first dies 704, 705, 707 and 709 which all located at the same position in the mask fields are captured. For each of the inspection image, two reference images each from a second die are captured. The second die is located in a different position from positions of the first dies in the mask fields. For instance, for a first die 704, two reference dies can be selected as the two dies adjacent to the die 704, such as, e.g., the upper die 702 and the lower die 706. In another example, for another first die 702, the two reference dies can be selected as the two lower dies 704 and 706. It is to be noted that more than two reference dies can be selected, and the reference dies do not necessarily locate in the same field as the first die. However, it is required that the reference dies does not locate at the same positions as the first die and corresponding dies. For example, the reference dies for die 704 should not be selected as dies 705, 707 and 709, etc.

According to certain embodiments, the two or more mask fields are printed on the specimen using a lithography mask. The lithography mask is not limited to the photolithography technology employed therein (e.g., not limited by the wavelength utilized therein). By way of example, the mask can be an Extreme Ultraviolet (EUV) mask or a Argon Fluoride (ArF) mask.

In some embodiments, the first images and the second images can be captured (e.g., by the inspection unit) respectively for one or more detection channels (e.g., bright field (BF) channel and gray field (GF) channel in the case of an optical inspection tool). Accordingly the image processing process as will be described in details below with respect to blocks 204 and 210 can be performed respectively for each detection channel and the defect determination process as will be described in details below with respect to block 212 will be based on the one or more detection channels.

Continuing the process in FIG. 2, upon the first images and the second images being captured, these images can be processed (e.g., by the image processing module 104 of the processing unit 102, as illustrated in FIG. 1). Specifically, for each first image, a third image (also referred to as a grade image hereinafter) can be generated (204), thereby obtaining a plurality of third images corresponding to the plurality of first images. The generation of a third image for a given first image comprises generating (206) a difference image based on a difference between pixel values of the given first image and pixel values derived from the two or more second images, and generating (208) a corresponding third image constituted by pixels with values computed based on corresponding pixel values in the difference image and a predefined difference normalization factor.

According to certain embodiments, prior to the generation of the grade images, a given first image (i.e., inspection image) and the reference images thereof can be registered to be aligned. Some differences between the positions of the inspection image and the reference images are likely to occur for various reasons—scanning conditions (e.g. illumination) as well as imperfections, shifts and outright errors in the scanning process, manufacture errors, and so forth. The registration process can be implemented according to any suitable method of registration algorithms known in the art.

In order to generate a difference image for each given first image, difference between pixel values of the given first image and corresponding pixel values of the two or more reference images (or pixel values derived from the two or more reference images) are used. By way of example, corresponding pixel values of the two or more reference images can be combined and averaged (not limited to the averaging method that can be applied), and difference between the pixel values of the given first image and the averaged pixel values derived from the two or more reference images can constitute the pixel values of the difference image. The pixel values in the difference image can be further processed or computed with respect to a predefined difference normalization factor, giving rise to pixels, each with a value indicative of a grade thereof, constituting a grade image. The predefined difference normalization factor can be determined based on behavior of normal population of pixel values and can be used to normalize the pixel values of the difference image. By way of example, the grade of a pixel can be calculated as a ratio between a corresponding pixel value of the difference image and the predefined difference normalization factor.

According to certain embodiments, optionally, an adaptive imaging operation can be applied in the process of generating a grade image, for the purposes of dealing with noises occurred in the given first image and/or the second images. The noises can include noises caused by different variations, such as, color variation, variations of the specimen, e.g., process variation, etc. The noises can also include noises generated during inspection by the inspection unit. Specifically, the difference image can be generated based on a corrected difference between pixel values of the given first image and pixel values derived from the two or more second images, giving rise to a corrected difference image so as to compensate the aforementioned noises, i.e., noises occurred in the first image and/or the second images. Accordingly a corresponding third image is generated including pixels with values computed based on corresponding pixel values in the corrected difference image and a predefined difference normalization factor.

It is to be noted that the generation of difference image and grade image as described above are illustrated as non-limiting examples and are for the purpose of illustration only and should by no means be construed as limiting the present disclosure in any way. Other alternative ways of calculating pixel values for a difference image and/or a grade image can be applied in addition or in lieu of the above.

Once a plurality of third images (i.e., grade images) are generated for the plurality of first images, an average third image (also referred to as average grade image hereinafter) can be generated (210) (e.g., by the image processing module 104 of the processing unit 102, as illustrated in FIG. 1) which is constituted by pixels with values computed as accumulated pixel values of corresponding pixels in the plurality of third images divided by the number of the two or more mask fields. Continuing with the example of FIG. 7, a grade image is generated for each of first dies 704, 705, 707 and 709 using the above described methods, giving rise to four grade images corresponding thereto. The pixel values of the four grade images are accumulated and divided by the number of fields (i.e., four fields in this example), giving rise to an average grade image (FIG. 7 only illustrates a portion of the average grade image 714 corresponding to the first dies 704, 705, 707 and 709). In the example of FIG. 7, after the accumulation and averaging, the signal of the repeating defects 708 (represented by pixel values) at the location of these defects in the average grade image will not be reduced, due to the repetitive nature of these defects. On the other hand, the signal of the random defects which do not repeat themselves in different fields, such as, e.g., 710 and 712, will be reduced after the averaging process.

Accordingly, presence of repeating defects on the specimen can be determined (212) (e.g., by the repeating defect determination module 106 of the processing unit 102, as illustrated in FIG. 1) based on the average third image and a predefined defect threshold. The predefined defect threshold can be determined based on the total amount of desired false alarm rate. By way of example, any pixel in the average third image with a value that exceeds the predefined defect threshold can be determined as an indication of presence of repeating defects in the corresponding first images. In the example of FIG. 7, since the signal of the repeating defects 708 remains substantially the same, whereas the signal of the random defects 710 and 712 (or noises) are reduced, the signal-to-noise ratio of the repeating defects 708 is increased, thereby rendering these defects being easier to be separated from the random defects or noises. In other words, a more sensitive threshold can be determined thereby enabling the system to reveal more real repeating defects which previously would be buried within the noises due to the weak or low signal level thereof as compared to the noises. Therefore, the present disclosed detection method is capable of increasing the level of sensitivity of detection for these repeating defects.

According to certain embodiments, in the case where the first images and the second images are captured respectively for one or more detection channels (e.g., BF channel and GF channel), the generating a third image and generating an average third image as described above with reference to blocks 204 and 210 are performed respectively for each detection channel, giving rise to respective average third images (e.g., a BF average third image and a GF average third image). The determination (212) of presence of repeating defects on the specimen can be based on the respective average third images and a predefined composite defect threshold composed of a combination of one or more defect thresholds of the one or more detection channels.

Figure 3:
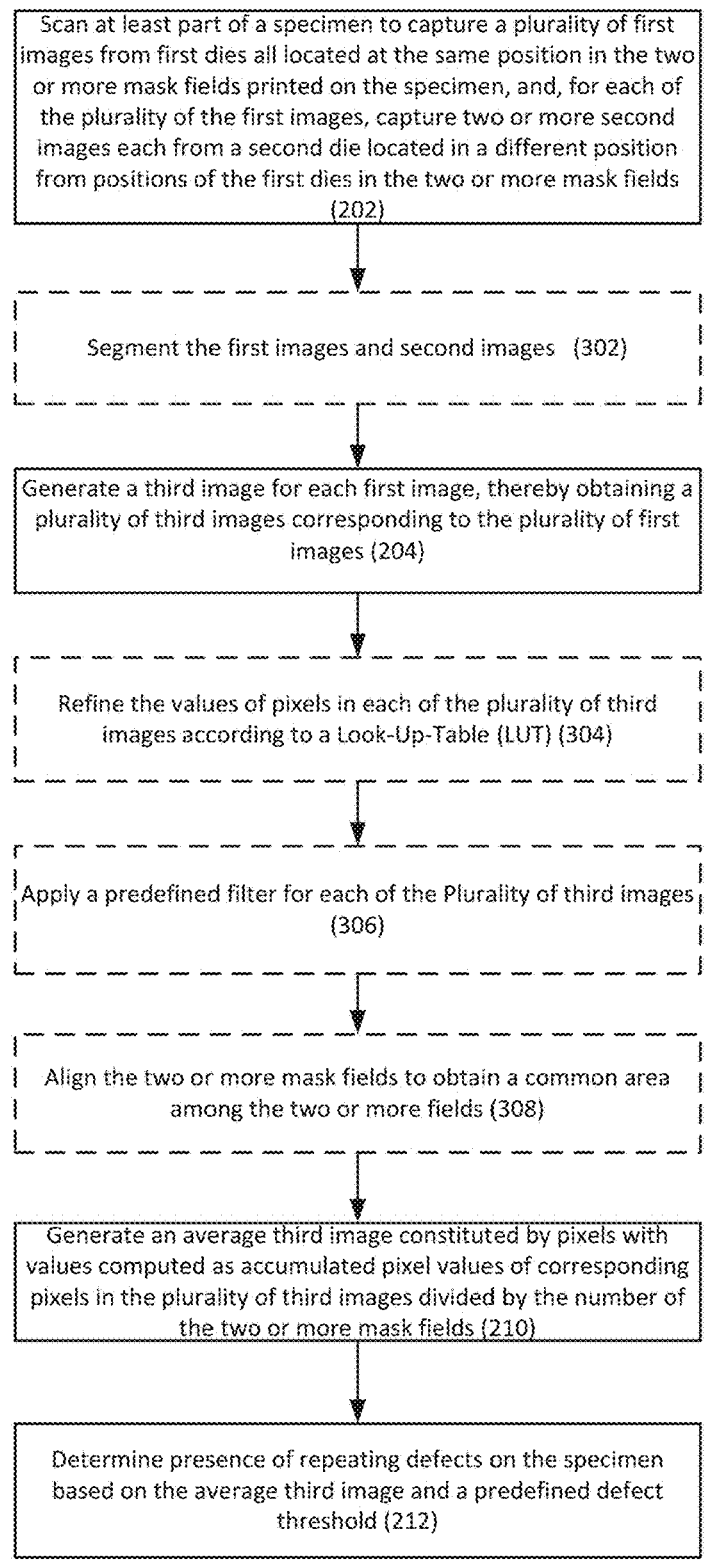
FIG. 3 illustrates a generalized flowchart of an enhanced process of detecting repeating defects on a specimen in accordance with certain embodiments of the presently disclosed subject matter.

Turning now to FIG. 3, there is illustrated a generalized flowchart of an enhanced process of detecting repeating defects on a specimen in accordance with certain embodiments of the presently disclosed subject matter.

Once the first images and the second images are captured (202) and registered, as described above with reference to FIG. 2, optionally, the first images and the second images can be segmented (302) (e.g., by the image processing module 104 of the processing unit 102, as illustrated in FIG. 1) according to certain factors indicative of sensitivities of different image areas or regions, such as, e.g., different noise levels, etc., resulted in different segments or regions in the images corresponding to different noise levels. By way of example, each of the images can be segmented into regions including but not limited to: noisy, very noisy and quite regions. In some cases, a pair of a first image and corresponding second image(s) can be segmented together. Accordingly the image processing and defect determination processes described with respect to blocks 206, 208, 210 and 212 can be performed per segment or region. The segmentation process can be implemented according to one or more similarity and/or discontinuity criteria and segmentation algorithm(s) known in the art, including, by way of example, histogram-based, edge-based, boundary-based, variance-based, watershed and/or other segmentation algorithms.

In some embodiments, the first images and the second images can be both captured for different detection channels and segmented according to different noise levels, giving rise to different perspectives—different combinations of detection channels and noise levels. For example, for images that are captured for BF and GF channels and are segmented into noisy, very noisy and quite regions, there will be provided in total six perspectives, and the image processing process with respect to blocks 206, 208 and 210 can be performed per perspective, and the defect determination process with respect to block 212 can be based on all or at least some of the perspectives.

In the case that the first images and the second images are segmented according to different noise levels, the predefined difference normalization factor as used in generating a third image as described with respect to block 208 can be set differently for each segment with different noise levels such that the generated grade image can duly reflect different image areas with different sensitivities.

Once a plurality of third images are generated (204) corresponding to the plurality of first images, as described above with reference to FIG. 2, optionally, the values of pixels in the plurality of third images can be refined (304) or updated according to a Look-Up-Table or Lookup Table (LUT). A LUT refers to an array or any other representations thereof used to transform the input data into a more desirable output data with an array indexing operation. In some embodiments, the LUT used to refine the pixel values of the third images can be defined based on prior knowledge of defect and noise distribution in the third images.

Figure 4:
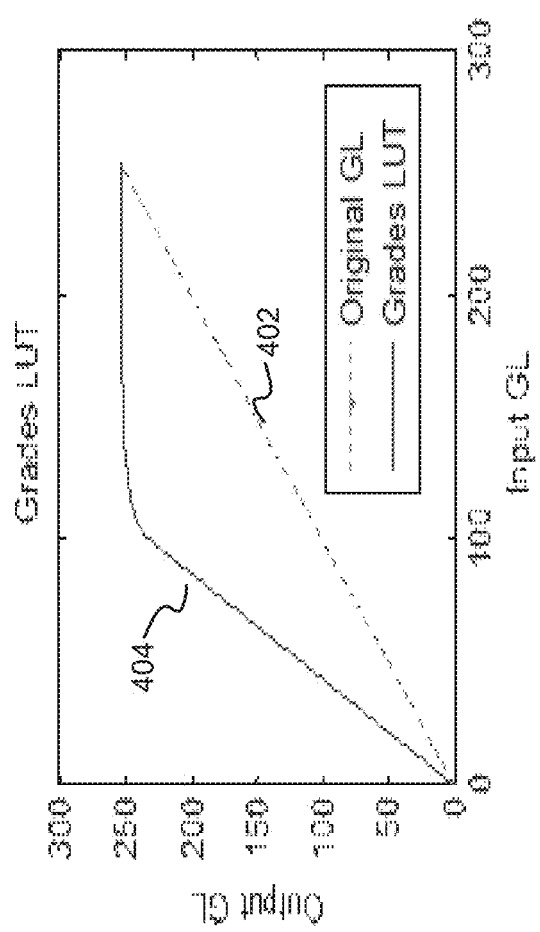
FIG. 4 illustrates a graph representation of an exemplary LUT applied to a grade image in accordance with certain embodiments of the presently disclosed subject matter.

Referring now to FIG. 4, there is illustrated a graph representation of an exemplary LUT applied to a grade image in accordance with certain embodiments of the presently disclosed subject matter.

The X axis in the graph represents the input data—the original pixel values in a grade image, and the Y axis represents the output data—the refined pixel values after applying LUT to the input data. For comparison purposes, a dotted line 402 is illustrated representing that, without going through the refining process using LUT, the output pixel values remain the same as the input pixel values. The solid line 404 represents an indexing or mapping relationship between the input pixel values and output refined pixel values after applying an exemplary LUT. As compared with 402, it is shown in 404 that for input pixel values in the range of [0,100], the corresponding output pixel values are transformed to be in a larger range of [0, 250]. The two lines 402 and 404 gradually converge together within the range of [100, 255]. The LUT to be applied can be determined based on prior knowledge of how the defect and noise signals are likely to distribute in grade images of different dies in the inspected wafer and/or previous wafers. In the case that it is learnt from these similar images that most of the defect-like signals are within a pixel value range of [0, 100], the above exemplified LUT operation can be applied in order to "expand" the range of defect-like input data, thereby increasing the resolution of input data that are most likely to be defects which in turn increases the sensitivity of defect detection.

Turning back to FIG. 3, in response to a plurality of third images being generated (204) (with or without applying LUT (304)), optionally, a predefined filter can be applied (306) for each of the plurality of third images. By way of example, for each given third image, the filtering operation can be performed by applying, for each given pixel of at least part of the given third image, a predefined filter on a kernel (i.e., an image block) with a predefined size centered around the given pixel, and assigning a value to the given pixel (i.e., the center pixel of the kernel) according to a filtering result on the kernel. One of the purposes of the filtering operation is to fix the shift of pixels occurred due to e.g., registration residuals etc.

Figure 5:
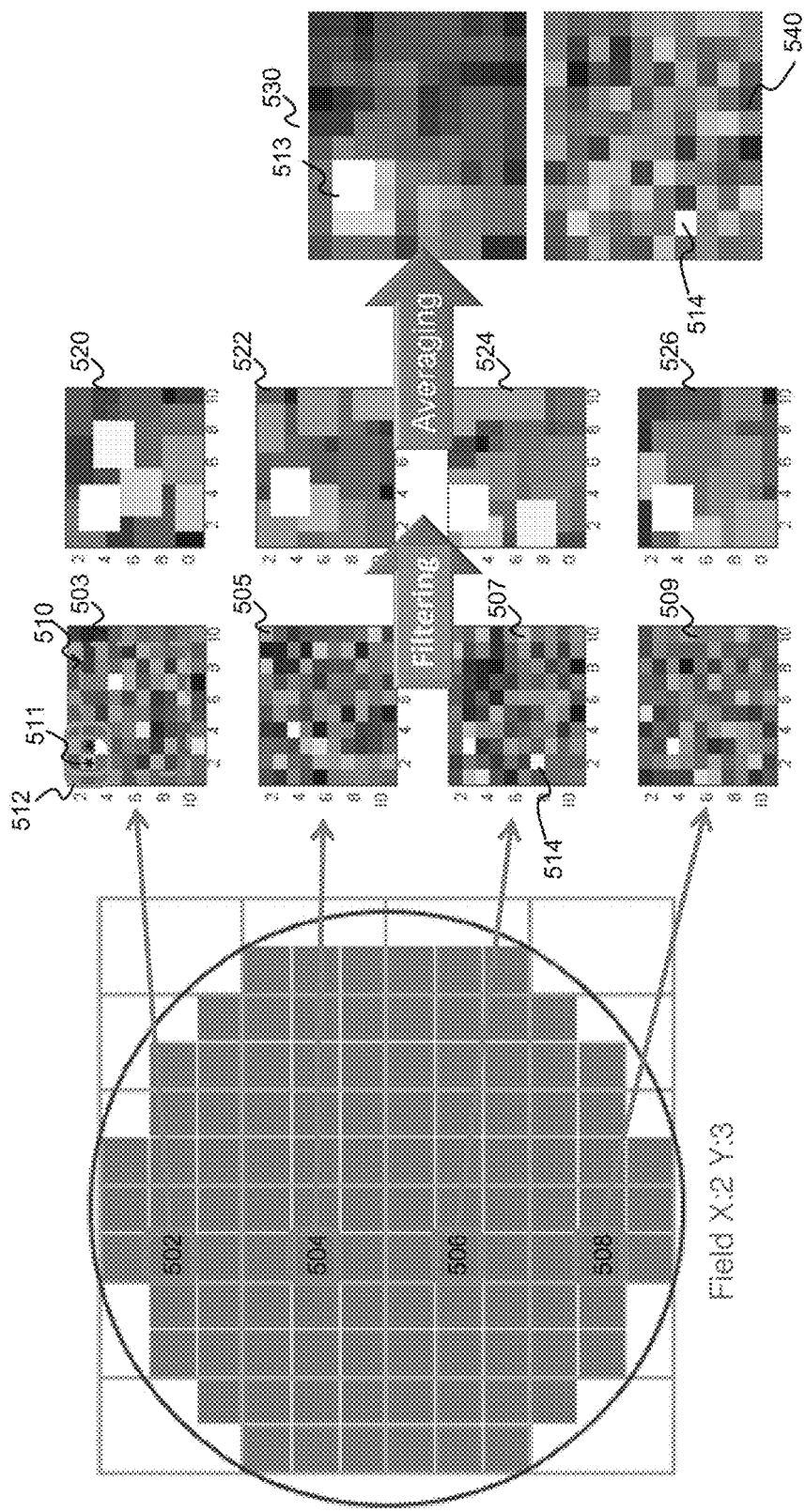
FIG. 5 illustrates an example of applying a predefined filter for grade images in accordance with certain embodiments of the presently disclosed subject matter.

Referring now to FIG. 5, there is illustrated an example of applying a predefined filter for grade images in accordance with certain embodiments of the presently disclosed subject matter.

In FIG. 5, there is shown an exemplified wafer printed with mask fields each comprising six dies (in the arrangement of 2 dies in a row×3 dies in a column). For the plurality of first dies 502, 504, 506, and 508 located at the same position of different mask fields in one column, there are shown corresponding third images (i.e., grade images) 503, 505, 507, and 509 related thereto (exemplified as images in a size of 10 pixel×10 pixel). For each of the grade images, a filtering operation is performed. Take grade image 503 for example, for each given pixel of at least part of the image (e.g., a selected region 510 (illustrated in dotted line) in image 503 excluding the boundary pixels along the edges), a kernel (i.e., an image block) with a predefined size centered around the given pixel can be defined or selected. For instance, for the first pixel 511 in the region 510, the kernel 512 is selected to be a 3 pixel×3 pixel image block centered around pixel 511. A predefined filter can be applied to the kernel. The pixel value of the center pixel 511 of the kernel 512 is assigned according to a filtering result on the kernel.

Similarly, the above process is repeated for each pixel within the region 510 (a next pixel and a next kernel are illustrated in FIG. 5 for exemplified purposes), giving rise to a filtered grade image 520 corresponding to grade image 503. Filtered grade images 522, 524 and 526 are generated in a similar manner, corresponding to grade images 505, 507, and 509. The plurality of filtered grade images 520, 522, 524 and 526 will be the input images for generating the average third image as described with reference to block 210.

In the above example, assume that 513 is a repeating defect which got shifted in the grade images 505, 507, and 509. On the other hand, 514 is a random defect or noise that only occurs in grade image 507. In the average third image 540 generated without the filtering operation, the real repeating defect 513 is smeared and therefore "disappeared", whereas the random defect 514 has a stronger signal and is revealed. As compared with 540, in the filtered grade image 530, the real repeating defect 513 is detected due to the filtering operation which maximizes the presence of repeating defects.

Figure 6:
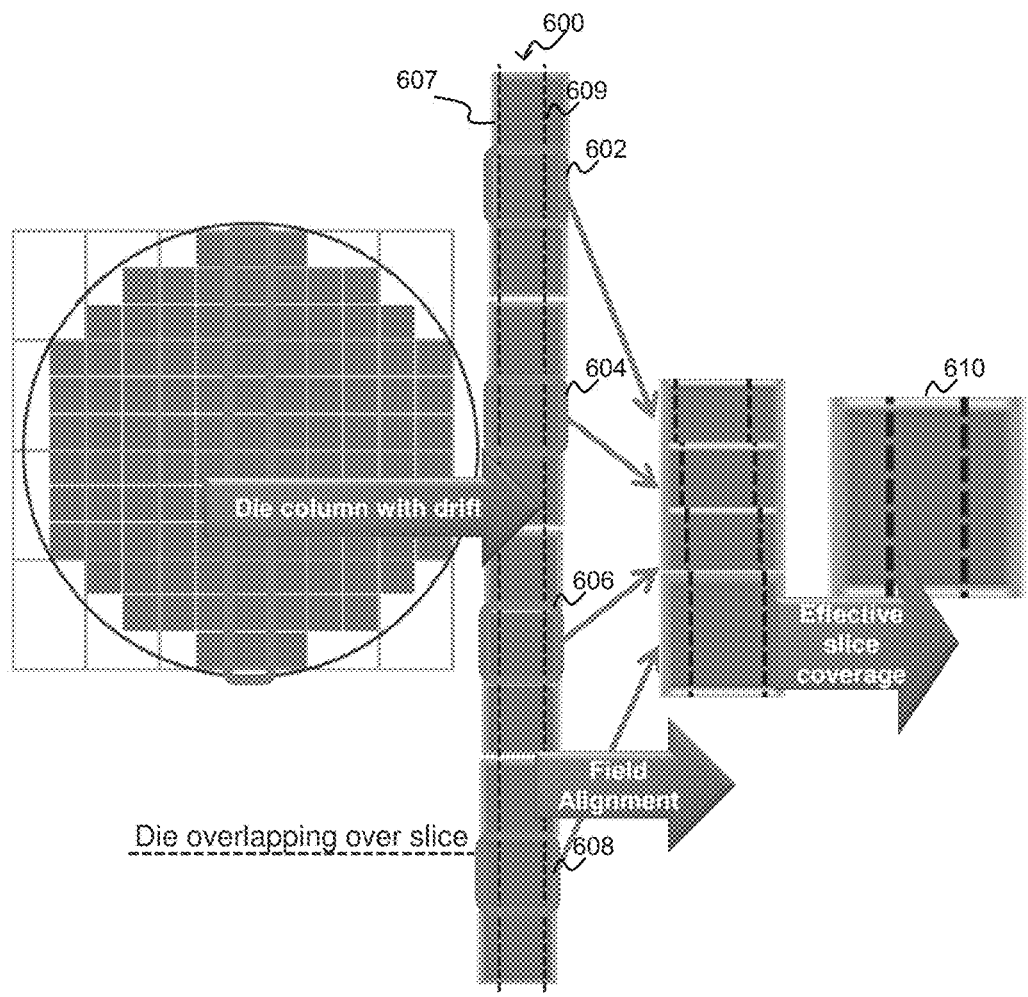
FIG. 6 illustrates an example of field alignment in accordance with certain embodiments of the presently disclosed subject matter.

Turning back again to FIG. 3, in response to a plurality of third images being generated (204) (with or without applying LUT described with reference to 304 and/or the filtering operation described with reference to 306), optionally, field alignment for the plurality of third images corresponding to the first dies in the two or more mask fields can be performed (308) to obtain a common area among the plurality of third images. The generation of an average third image described with reference to 210 can be performed for pixel values in the common area. FIG. 6 illustrates an example of field alignment in accordance with certain embodiments of the presently disclosed subject matter.

According to certain embodiments, a wafer can be scanned by the inspection unit in the direction of a die column or a die row. More specifically, in some cases, the wafer can be scanned per slice, the slice lying along a scanning axis (e.g., either X or Y axis) and having a total area. By way of example, a slice can be in the direction of a die column (i.e., along the Y axis) and can have a width of 200 pixels. For instance, the wafer as illustrated in FIG. 6 is scanned in the direction of die column. As shown, the wafer in FIG. 6 is printed with mask fields each comprising six dies (in the arrangement of 2 dies in a row×3 dies in a column). One die column 600 contains dies from four mask fields. For example, images 602, 604, 606, and 608 represent corresponding dies located at the same position in the four mask fields included in column 600. Due to differences caused by various reasons, such as, e.g., scanning conditions (e.g. illumination), imperfections, shifts and outright errors in the scanning process, and manufacture errors, etc., drift may occur between inspections of different dies in a die column, as illustrate in FIG. 6. The area between the two dotted lines 607 and 609 are the overlapping scanning area effectively covered by the slice scanning process between all the dies in the die column.

Although the inspection image of a given die and the reference images thereof (e.g., the images for the upper and lower dies of the given die) are already registered through the registration process as described with respect to FIG. 2, images for dies between different mask fields are not aligned or registered. Therefore, images for dies from different mask fields, such as the images 602, 604, 606, and 608, cannot be simply accumulated and averaged before these images are aligned with each other. Thus, it is required to perform field alignment in order to align the images (e.g., the grade images) for dies from different mask fields to obtain a common or overlapping area 610 (e.g., effective slice coverage) among the images, prior to generating the average grade image. And the accumulation and averaging as described in the generation of an average third image (described with reference to 210) can be performed only for pixel values in the common area.

It is to be noted that although the LUT operation, filtering operation and field alignment described with respect to blocks 304, 306 and 308 are described and illustrated in a certain order (as shown in the flow chart of FIG. 3), the teachings of the presently disclosed subject matter are not bound by the order of the steps in the flow chart illustrated in FIG. 3. The illustrated operations can occur out of the illustrated order. For example, these operations shown in succession can be executed in the reverse order or any other suitable order.

It is also noted that whilst the flow charts illustrated in in FIG. 2 and FIG. 3 are described with reference to elements of system 100, this is by no means binding, and the operations can be performed by elements other than those described herein.

It is to be further noted that in some cases the image processing and defect detection processes can be performed upon the scanning/inspection (e.g., by the inspection unit) of the specimen or at least all the relevant sections thereof being completed. In some other cases the scanning of the specimen and the image processing process can be performed in parallel. By way of example, once the inspection unit scanned part of the specimen, the image processing operation, or at least part thereof, can be performed on the obtained inspection images, while at the same time the inspection unit can move on to scan subsequent part of the specimen.

Having described the multi-die scenario (i.e., each mask filed comprising multiple dies), there is now provided a single-die scenario in which two or more mask fields are printed on a first specimen (also referred to herein as a current specimen or a present specimen) and each mask field comprises a single die. In such cases, if there is a defect on the mask thereby causing presence of repeating defects on the specimen, the repeating defects will appear in each and every die on the specimen. Therefore, this type of repeating defects cannot be detected based on a D2D inspection approach as described above, since the presence of repeating defects in every die preclude their detection. In other words, no reference images from the same specimen can be used, thus it is needed to obtain references from somewhere else.

According to certain embodiments, there is provided a Die-to-History (D2H) inspection methodology in which inspection images from another specimen (also referred to herein as a second specimen or a previous specimen) are used as references for defect detection in the first specimen. If the first specimen is obtained by printing two or more mask fields thereon at a present time (e.g., t=t'), a second specimen that is obtained by printing the same mask fields thereon (i.e., using the same mask) at a baseline time (e.g., a previous time t=0) can be used. For instance, the mask is relatively clean or was just manufactured at time t=0.

Specifically, the first specimen, or at least part thereof, can be scanned (e.g., by the inspection unit 120 illustrated in FIG. 1) to capture a plurality of first images (i.e., inspection images) from the dies in the two or more mask fields (one die in each mask field). For each of the plurality of the first images, a second image (i.e., reference image) can be generated based on two or more previous images captured from the dies in the two or more mask fields printed on a second specimen, the second specimen being obtained by printing the two or more mask fields thereon at a baseline time. By way of example, the second image can be generated by, e.g., averaging, or weighted averaging, or calculating median of the pixel values in the two or more previous images, or any other suitable approaches of deriving an average image from multiple images. The averaging of all the previous images for all dies on the second specimen allows repeating defects above a certain intensity level to be included in the second image, while effectively suppressing random defects and noises.

Once the plurality of first images and the second image are obtained, the image processing can be performed (e.g., by the image processing module 104 illustrated in FIG. 1) similarly as described above with reference to blocks 204, 206, 208 and 210. Specifically, for each first image, a third image can be generated, thereby obtaining a plurality of third images corresponding to the plurality of first images. The process of generating a third image for a given first image comprises: generating a difference image based on a difference between pixel values of the given first image and pixel values of the second image, and generating a corresponding third image constituted by pixels with values computed based on corresponding pixel values in the difference image and a predefined difference normalization factor. An average third image can be generated, constituted by pixels with values computed as accumulated pixel values of corresponding pixels in the plurality of third images divided by the number of the two or more mask fields. Presence of repeating defects on the specimen can be determined (e.g., by the repeating defect determination module 106 illustrated in FIG. 1) based on the average third image and a predefined defect threshold. Specifically, the repeating defects can be indicative of any added defect on the mask between the two time points of 0 to t'.

Figure 8:
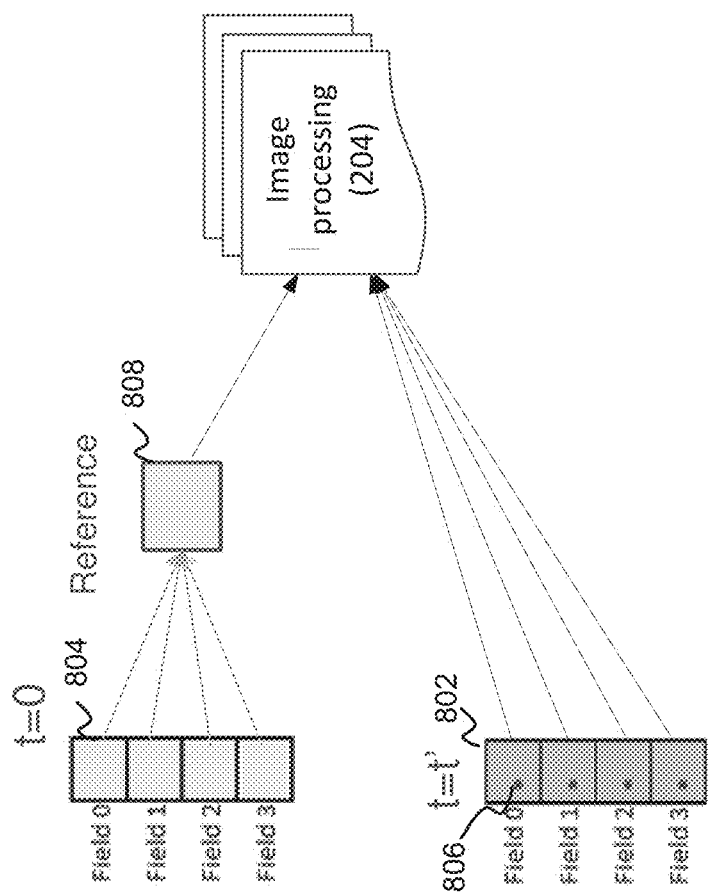
FIG. 8 illustrates an example of a single-die scenario in accordance with certain embodiments of the presently disclosed subject matter.

Turning now to FIG. 8, there is illustrated an example of a single-die scenario in accordance with certain embodiments of the presently disclosed subject matter.

For illustrative purposes, there is shown a first wafer 802 having four mask fields (i.e., field 0-field 3) printed thereon (e.g., in a column), each of the mask field comprising a single die. The first wafer 802 is manufactured using a single-die mask at a present time t=t'. There is also shown a second wafer 804 having the same four mask fields printed thereon. The second wafer 804 is manufactured using the same single-die mask at a baseline time t=0. Repeating defects 806 are present in the same location of all dies (i.e., all mask fields). In order to detect the repeating defects, a reference image 808 is generated, e.g., by averaging the inspection images of all dies on the second wafer 804. Inspection images for all the dies of the first wafer 802, and the reference image 808 derived from the second wafer, are provided as input for the image processing process as described with reference to block 204. A grade image is generated for each inspection image of the first wafer, giving rise to four grade images corresponding to the four inspection images for the four dies in first wafer 802. The four grade images can be accumulated and averaged, giving rise to an average grade image. The determination of repeating defect is based on the average grade image and a predefined defect threshold.

It is to be noted that the segmentation, adaptive imaging operation, LUT operation, filtering operation and field alignment as described with reference to FIGS. 2 and 3 can be similarly applied to the single-die scenario, either individually or in any suitable combination.

It is to be noted that the examples and embodiments described herein are illustrated as non-limiting examples and should not be construed to limit the presently disclosed subject matter in any way.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system of detecting repeating defects on a specimen, the specimen being obtained by printing two or more mask fields thereon, each of the two or more mask fields comprising multiple dies, the computerized system comprising:
   an inspection unit configured to capture a plurality of first images from first dies all located at the same position in the two or more mask fields printed on the specimen, and, for each of the plurality of the first images, capture two or more second images each from a second die located in a different position from positions of the first dies in the two or more mask fields; and
   a processing unit operatively connected to the inspection unit, the processing unit comprising a memory and a processor operatively coupled thereto, wherein the processing unit is configured to:
   generate a third image for each first image, thereby obtaining a plurality of third images corresponding to the plurality of first images, wherein generating a third image for a given first image comprises:
      generating a difference image based on a difference between pixel values of the given first image and pixel values derived from the two or more second images, and
      generating a corresponding third image constituted by pixels with values computed based on corresponding pixel values in the difference image and a predefined difference normalization factor;
   generate an average third image constituted by pixels with values computed as accumulated pixel values of corresponding pixels in the plurality of third images divided by the number of the two or more mask fields; and
   determine a presence of repeating defects on the specimen based on the average third image and a predefined defect threshold.

2. The computerized system according to claim 1, wherein the inspection unit is an optical inspection machine or an E-beam inspection machine.

3. The computerized system according to claim 1, wherein the two or more mask fields are printed on the specimen using a lithography mask, the lithography mask being an Extreme Ultraviolet (EUV) mask or an Argon Fluoride (ArF) mask.

4. The computerized system according to claim 1, wherein the two or more second images are captured from two or more second dies adjacent to the first dies.

5. The computerized system according to claim 1, wherein the processing unit is further configured to segment the first images and the second images according to sensitivities of different image areas, and wherein the generating a third image, generating an average third image, and the determining are performed per segment.

6. The computerized system according to claim 1, wherein the first images and the second images are captured respectively for one or more detection channels, and wherein the generating a third image and generating an average third image are performed respectively for each detection channel, giving rise to respective average third images for the one or more detection channels, and wherein the processing unit is configured to determine presence of repeating defects on the specimen based on the respective average third images and a predefined composite defect threshold composed of a combination of one or more defect thresholds of the one or more detection channels.

7. The computerized system according to claim 1, wherein the processing unit is further configured to refine the values of pixels in each of the plurality of third images according to a Look-Up-Table (LUT).

8. The computerized system according to claim 7, wherein the LUT is defined based on prior knowledge of defect and noise distribution in the third images.

9. The computerized system according to claim 1, wherein the processing unit is further configured to apply a predefined filter for each of the plurality of third images.

10. The computerized system according to claim 9, wherein the processing unit is configured to, for each given third image:
   for each given pixel of at least part of the given third image,
      apply the predefined filter on a kernel with a predefined size centered around the given pixel, and
      assign a value to the given pixel according to a filtering result on the kernel.

11. The computerized system according to claim 1, wherein the processing unit is further configured to perform field alignment for the plurality of third images corresponding to the first dies in the two or more mask fields to obtain a common area among the plurality of third images, and wherein the generating an average third image is performed for pixel values in the common area.

12. The computerized system according to claim 1, wherein to generate a third image, the processing unit is further configured to:
   generate a difference image based on a corrected difference between pixel values of the given first image and pixel values derived from the two or more second images, giving rise to a corrected difference image so as to compensate noises occurred in the given first image; and generate a corresponding third image constituted by pixels with values computed based on corresponding pixel values in the corrected difference image and a predefined difference normalization factor.

13. A computerized method of detecting repeating defects on a specimen, the specimen being obtained by printing two or more mask fields thereon, each of the two or more mask fields comprising multiple dies, the method comprising:
capturing, by an inspection unit, a plurality of first images from first dies all located at the same position in the two or more mask fields printed on the specimen, and, for each of the plurality of the first images, capture two or more second images each from a second die located in a different position from positions of the first dies in the two or more mask fields;
generating, by a processing unit, a third image for each first image, thereby obtaining a plurality of third images corresponding to the plurality of first images, wherein generating a third image for a given first image comprises:
generating a difference image based on a difference between pixel values of the given first image and pixel values derived from the two or more second images, and
generating a corresponding third image constituted by pixels with values computed based on corresponding pixel values in the difference image and a predefined difference normalization factor;
generating, by the processing unit, an average third image constituted by pixels with values computed as accumulated pixel values of corresponding pixels in the plurality of third images divided by the number of the two or more mask fields; and
determining, by the processing unit, a presence of repeating defects on the specimen based on the average third image and a predefined defect threshold.

14. The computerized method according to claim 13, further comprising segmenting the first images and the second images according to sensitivities of different image areas, and wherein the generating a third image, generating an average third image, and the determining are performed per segment.

15. The computerized method according to claim 13, wherein the first images and the second images are captured respectively for one or more detection channels, and wherein the generating a third image and generating an average third image are performed respectively for each detection channel, giving rise to respective average third images, and the determining includes determining presence of repeating defects on the specimen based on the respective average third images and a predefined composite defect threshold composed of a combination of one or more defect thresholds of the one or more detection channels.

16. The computerized method according to claim 13, further comprising refining the values of pixels in each of the plurality of third images according to a Look-Up-Table (LUT).

17. The computerized method according to claim 13, further comprising applying a predefined filter for each of the plurality of third images.

18. The computerized method according to claim 17, wherein the applying comprises, for each given third image:
for each given pixel of at least part of the given third image,
applying a predefined filter on a kernel with a predefined size centered around the given pixel, and
assigning a value to the given pixel according to a filtering result on the kernel.

19. The computerized method according to claim 13, further comprising performing field alignment for the plurality of third images corresponding to the first dies in the two or more mask fields to obtain a common area among the plurality of third images, and wherein the generating an average third image is performed for pixel values in the common area.

20. A non-transitory computer readable storage medium tangibly embodying a program of instructions that, when executed by a computer, causing the computer to perform operations to detect repeating defects on a specimen, the specimen being obtained by printing two or more mask fields thereon, each of the two or more mask fields comprising multiple dies, the operations comprising:
obtaining a plurality of first images from first dies all located at the same position in the two or more mask fields printed on the specimen, and, for each of the plurality of the first images, obtaining two or more second images each from a second die located in a different position from positions of the first dies in the two or more mask fields;
generating a third image for each first image, thereby obtaining a plurality of third images corresponding to the plurality of first images, wherein generating a third image for a given first image comprises:
generating a difference image based on a difference between pixel values of the given first image and pixel values derived from the two or more second images, and
generating a corresponding third image constituted by pixels with values computed based on corresponding pixel values in the difference image and a predefined difference normalization factor;
generating an average third image constituted by pixels with values computed as accumulated pixel values of corresponding pixels in the plurality of third images divided by the number of the two or more mask fields; and
determining a presence of repeating defects on the specimen based on the average third image and a predefined defect threshold.

* * * * *